United States Patent [19]

Sandling

[11] Patent Number: 4,610,266

[45] Date of Patent: Sep. 9, 1986

[54] VALVE ASSEMBLY FOR SECURING A COVER TO A VALVE BODY WITH FASTENERS WHICH ARE FREE OF TENSILE STRESS

[75] Inventor: Michael J. Sandling, Cincinnatti, Ohio

[73] Assignee: Xomox Corporation, Cincinnati, Ohio

[21] Appl. No.: 742,266

[22] Filed: Jun. 7, 1985

[51] Int. Cl.⁴ .................... F16K 43/00; F16K 5/04; F16K 41/00
[52] U.S. Cl. .................................. 137/315; 137/375; 220/256; 220/319; 251/214; 251/312; 251/317
[58] Field of Search ............... 137/315, 375, 377, 381, 137/382; 220/235, 256, 319; 251/309, 310, 311, 312, 317, 214

[56] References Cited

U.S. PATENT DOCUMENTS

| | | | |
|---|---|---|---|
| 3,425,451 | 2/1969 | Smith | 251/317 |
| 3,521,856 | 7/1970 | Smith | 251/309 |
| 3,703,910 | 11/1972 | Smith | 251/309 |
| 4,272,057 | 6/1981 | Haugland | 137/315 |
| 4,410,003 | 10/1983 | Sandling | 251/312 |
| 4,496,071 | 1/1985 | Stewart | 220/319 |

Primary Examiner—George L. Walton
Attorney, Agent, or Firm—Frost & Jacobs

[57] ABSTRACT

A valve assembly for securing a valve cover to a valve body includes a fastening arrangement wherein the fasteners are free of tensile stress. In one arrangement, an outwardly extending retaining skirt is disposed about an access opening in a valve body and a cover member is secured to the retaining skirt. Threaded fasteners extend from the cover member and compressingly engage seals about the access opening.

10 Claims, 4 Drawing Figures

VALVE ASSEMBLY FOR SECURING A COVER TO A VALVE BODY WITH FASTENERS WHICH ARE FREE OF TENSILE STRESS

TECHNICAL FIELD

The invention relates generally to valves and more particularly to an assembly for securing a removable valve cover to a valve body with fasteners which do not experience tensile stress in order to substantially reduce the possibility that the fasteners will fail under the influence of high process media pressure. The invention will be specifically disclosed in connection with a valve assembly having a valve cover removably secured to an access opening in a valve body by threaded fasteners held in compression to sealingly close the opening.

BACKGROUND OF THE INVENTION

A typical valve includes a valve body having a movable valve member internally disposed therein. The movable valve member is positioned in a fluid flow passage extending between an inlet and an outlet of the body for selectively controlling fluid flow through the flow passage. Movement of the internally disposed valve member is usually effectuated by an actuating shaft interconnecting the valve member with an actuating mechanism, either manual or automatic, positioned externally of the housing. The actuating shaft is generally rigidly affixed to the valve member for common movement therewith.

In order to permit both assembly of the movable valve member within the body and subsequent maintenance, the valve body generally has an access opening which is closable by a removable valve cover. The actuating shaft may, as is the usual case, extend through an aperture in this cover. Fastening elements, most generally threaded members such as bolts or screws, may be used to removably secure the cover to the valve body. Screws, for example, are commonly used in an arrangement in which they extend through the cover and are received by threaded openings in the valve body to releasably join the cover to the valve body. Alternatively, bolts extending through aligned apertures in the valve cover and flanges on the valve body are used in another common arrangement for securing valve covers to valve bodies. The bolts may be removably held by nuts on the opposite flange side.

When used in a pressurized system, a valve is internally subjected to the pressure of the fluid process media flowing through the valve. This process media pressure tends to separate the valve cover from the valve body and imparts a tensile stress on the fastening elements connecting these two elements. In high pressure applications, the process media pressure, and the resulting tensile stress on the fasteners, may be quite substantial. Under standard engineering practices, fasteners of sufficient size and strength are selected to withstand tensile stresses well in excess of those to which the fasteners are expected to be subjected in operation.

Unfortunately, fasteners occasionally have material faults which excape detection, even when high quality inspection standards are employed. Such faults may, for example, take the form of a microscopic cracks in the material, and will substantially reduce the strength of the fastener material. Since tensile stresses tend to pull the material apart and accentuate microscopic cracks, such faults make fasteners under tensile stress especially prone to failure.

In addition to the problems of improper design and inadequate quality standards, many materials, including metals commonly used for bolts, screws and other similar fasteners, are subject to a phenomenon known as stress corrosion cracking. Although the mechanics of this phenomenon are not fully understood, stress corrosion cracking appears to result from exposure of the materials to particular elements. Chlorine and chlorine compounds, for example, attack certain stainless steel materials and cause the materials to fail under stress conditions. Other elements, such as sulfides, attack other metals and result in stress corrosion cracking. Even trace amounts of the attacking elements can cause the stress corrosion cracking phenomenon.

High performance materials, such as bolts or screws under high tensile stress, are particularly susceptible to stress corrosion cracking. The problem is particularly pronounced in high pressure valves located in chemical processing plants where many of the attacking elements, airborne or otherwise, come into contact with the cover fasteners and where the high pressure of process fluids commonly impart substantial tensile stress to bolts, screws or other types of fasteners securing a cover to a valve body. If the pressure of the process media exceeds the tensile strength of the fastener material, the fasteners will fail. Injury or death to persons working in proximity to the failed valve may result. To make the problem worse, stress corrosion cracking is not detectable from visual inspection and a fastener suffering from stress corrosion cracking may appear completely normal immediately prior to failure.

SUMMARY OF THE INVENTION

Accordingly, it is a primary object of the invention to provide a valve assembly which substantially reduces the risk that a valve cover will be blown off by the pressure of a process media being controlled by a valve.

It is another object of the invention to provide a valve assembly in wherein the fasteners connecting the valve cover to the valve body are substantially less susceptible to operational failure.

A still further object of the invention is to provide a valve assembly having a reduced susceptibility to failure which results from stress corrosion cracking.

Another object of the invention is to provide a valve assembly wherein the the fasteners securing the valve cover to the valve body are free of tensile stress.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the present invention as described herein, a valve assembly is provided for securing a valve cover to a valve body with fastening elements which are free of tensile stress. The assembly includes a valve body having an inlet and an outlet with a fluid flow passage extending therebetween. A valve member is movably disposed within the flow passage of the valve body and operative to control fluid flow through the flow passage in accordance with the position of the valve member. The valve body has an access opening for assembling and accessing the valve member. An actuating shaft is affixed to the valve member. This actuating shaft is adapted to mechanically interface with an actuating element positioned external to the valve body for effectuating movement of the valve member within the valve body. Cover means are secured to the valve body for covering and sealing the access opening. The cover means includes an opening for the actuating shaft. Fastening elements are provided for securing the cover means to the valve body. Means are also provided for sealingly closing the access opening with the cover means without the appliation of tensile stress to the fastening elements.

In accordance with another aspect of the invention, at least one of the fastening elements is threaded and adjustable to vary the sealing pressure of the cover means with respect to the valve body.

In yet another aspect of the invention, the cover means includes a cover member fixed to the valve body against axial movement along the actuating shaft. This threaded fastening element is threadably received in the cover member and axially adjustable therein.

In yet another aspect of the invention, the cover member is removably secured to the valve body.

In still another aspect of the invention, the cover means further includes a first collar. At least one of the threaded fastening elements is compressingly and adjustably engagable with the first collar to vary the sealing pressure between the cover means and the valve body.

According to a still further aspect of the invention, the cover means further includes a diaphragm with a centrally disposed aperature for receiving the actuating shaft. The second collar is operative to apply a compressive sealing force between the diaphragm and the actuating shaft.

In yet another aspect of the invention, the valve body includes an outwardly extending retaining skirt circumferentially disposed about the access opening. The cover member is secured to the retaining skirt.

In yet another aspect of the invention, one of the fastening elements is a key member extending between the cover member and the retaining skirt.

In one specific embodiment of the invention, the key member includes a flexible retaining wire.

Still other objects of the present invention will become readily apparent to those skilled in the art from the following description wherein there is shown and described a preferred embodiment of the invention, simply by way of illustration, of one of the best modes contemplated for carrying out the invention. As will be realized, the invention is capable of other different embodiments, and its several details are capable of modifications in various, obvious aspects all without departing from the invention.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
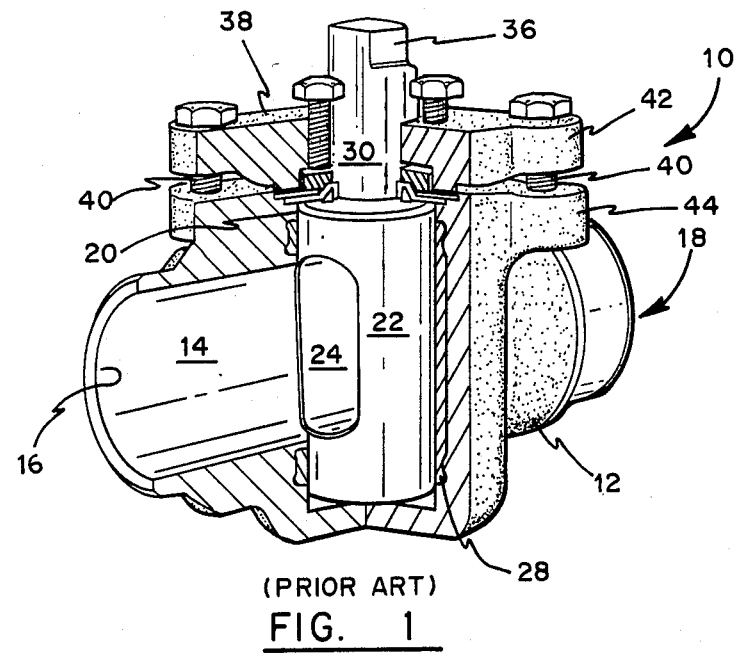
FIG. 1 is a three quarter sectional view of a prior art valve illustrating a conventional method of interconnecting a valve body and a valve cover.

Referring initially to the prior art valve depicted in FIG. 1, a tapered sleeved plug valve generally identified by the numeral 10 is shown. The valve 10 includes a valve body 12 having a internal fluid flow passage 14 extending therethrough. The flow passage 14 provides fluid communication between an inlet 16 and an outlet 18 (partially obscured in FIG. 1, but identified by an arrow). The valve body 12 has an access opening 20 intermediate the inlet 16 and outlet 18. This access opening 20 provides access to a movable valve member 22, specifically illustrated as a tapered plug in the illustration, which is moved within the valve body 12 to selectively control the flow of fluid through the flow passage 14. The plug 22 has a through passageway 24 which is selectively brought into and out of registry with the flow passage 14 in accordance with the rotation of the plug 22. A sleeve 28 formed of a plastic such as fluorinated hydrocarbon or other material inert to to process media flowing through flow passage 14, is shown interposed between plug 22 and the valve body 12. The illustrated sleeve 28 is apertured in correspondency with the plug 22 so as to permit fluid flow through the plug passageway 24 whenever the plug passageway 24 is brought into registry with the flow passage 14 extending through the valve body.

Rotational movement of the plug 22 is effectuated by an actuating shaft 30 rigidly affixed to the plug 22. The actuating shaft 30 extends through an aperture 32 in a valve cover 34 for interconnection with an actuating mechanism (not shown) disposed external to the valve housing 12. The outboard end of the illustrated shaft 30 has a flat 36 designed to facilitate such an interconnection.

The access opening 20 of the prior art valve 10 is closed by a removable cover 38, which cover 38 is removably secured to the valve body 12 through the agency of a plurality of bolts 40. The bolts 40 extend through aligned apertures (not shown) in correspondingly angularly spaced flanges 42,44 which extend radially outwardly from valve cover 38 and valve body 12, respectively. Nuts (not shown) may be used to secure the bolts 40 to the underside of the flanges 44. Alternatively, the aperture in flange 44 may be closed ended and threaded for threadably receiving the bolts 40.

As will be apparent to those skilled in the art, fluid pressure of a process media flowing through the flow passage 14 tends to separate the cover 38 from the valve body 12. This separating force places a tensile stress on the bolts 40 and such bolts 40 are therefore particularly prone to failure. Moreover, as previously noted, high tensile stress makes such bolts particularly susceptible to stress corrosion cracking.

Figure 2:
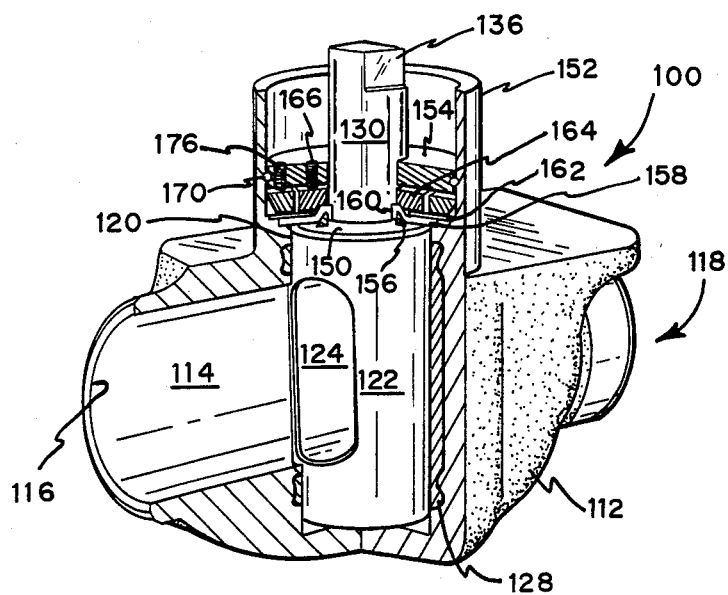
FIG. 2 is a three quarter sectional view of a valve similar to the valve of FIG. 1, but employing the principles of the present invention wherein the fasteners are free of tensile stress.

The aforementioned problems of the prior art are avoided by the valve 100 depicted in FIG. 2. The valve construction of FIG. 2 incorporates the principles of applicant's invention and eliminates tensile stress in the valve cover fasteners. As illustrated, the valve 100 is similar to the prior art valve 10 in FIG. 1 and, accordingly, components of the valve 100 will be identified by numbers which exceed by one hundred the identifying numbers used in describing corresponding components of FIG. 1.

The illustrated valve 100, like the valve 10, includes a movable valve member in the form of a tapered plug 122 disposed within an internal flow passage 114 for controlling fluid flow through the passage 114. Such fluid flow control is achieved by selectively bringing a through passageway 124 in the plug 122 into and out of registry with the flow passage 114 by rotating the plug 122 about the axis of an actuating shaft 130. This top portion of the plug 122 includes a shoulder 150 to which the activating shaft 130 is rigidly affixed. The activating shaft 130 extends out of the valve body 112 through the access opening 120.

Unlike the valve of FIG. 1, the preferred and illustrated embodiment of applicant's invention depicted in FIG. 2 includes a retaining skirt 152, preferably of cylindrical configuration, extending outwardly from the periphery of the access opening 120. As illustrated, the retaining skirt 152 is concentrically disposed about the actuating shaft 130.

A valve cover 154 is fitted and secured within retaining skirt 152 to close the access opening 120. Preferably, the valve cover 154 is removably secured within retaining skirt so as to permit removal of the removable valve member 122 and of the associated sealing components. In the present preferred form of the invention, the cover 154 is secured to the interior cylindrical surface of the retaining skirt 152 by a keying arrangement described hereinafter. Whatever means are used for securing the valve cover 154 within the retaining skirt 152, it is important that the valve cover 154 be retained against axial movement out of the retaining skirt 152.

Figure 3:
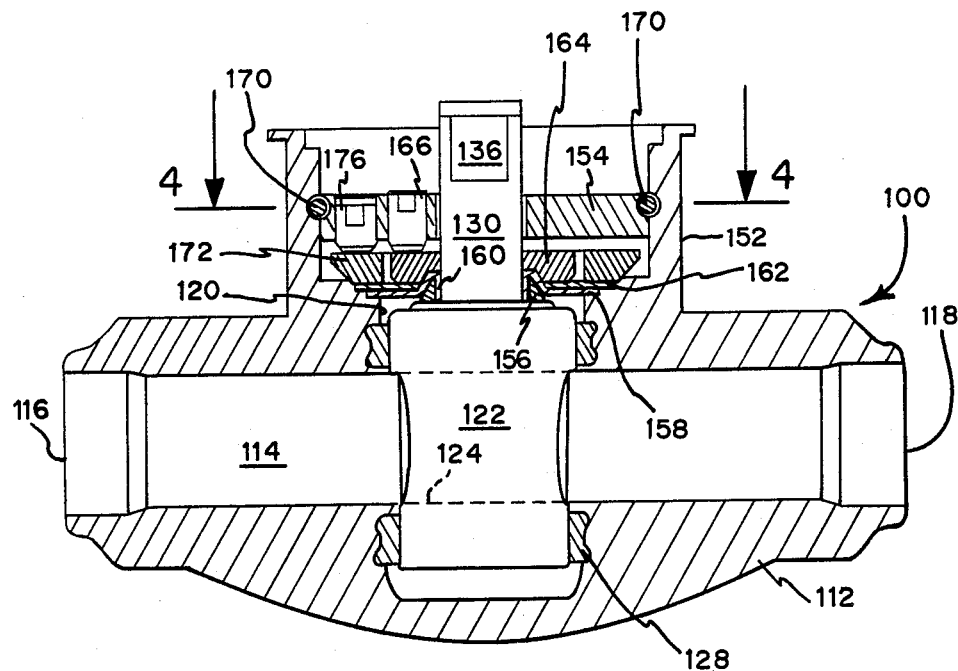
FIG. 3 is a fragmentary cross-sectional view of the valve of FIG. 2 depicting the valve cover and seal assembly.

In the illustrated form of the invention, a V-shaped sealing wedge ring 156 (best seen in FIG. 3) is supported on the plug shoulder 150 and received within a correspondingly inverted V-shaped groove formed in a diaphragm seal 158. In the preferred form, the ring 156 and the diaphragm 158 are formed of a semi-flexible plastic such as fluorinated hydrocarbon or other material inert to a wide range of process media. The plastic diaphragm 158 has a centrally disposed aperture defined by the inner surface 160 of the V-shaped wedge receiving groove. This inner groove surface 160 compressingly engages the actuating shaft 130 adjacent the plug shoulder 150.

A metal diaphragm 162 is placed over the plastic diaphragm 158. The diaphragm 162 is of larger diameter than the diaphragm 158 and is received in a separate counterbore of the valve body 112 so as to protect the plastic diaphragm 158 from damage when the sealing arrangement for the access opening 120 is tightened, which tightening will be further described below. The metal diaphragm 162 has a central aperture which is larger than that of plastic diaphragm 158 and which receives both the actuating shaft 130 and the inverted V-shaped groove-forming protruberance of plastic diaphragm 158.

A thrust collar 164 having an obliquely oriented interior underside surface is on the metal diaphragm 162 with the obliquely oriented surface in engagement with the outside surface of the V-shaped groove. The thrust collar 164 acts to ensure a uniform sealing pressure against the outside of the V-shaped groove, and this sealing pressure is transmitted through the wedge ring 156 to provide a sealing pressure between the inside surface of the V-shaped groove and the actuating shaft 134. Thrust is adjustably applied to the thrust collar 164 for varying the sealing pressure about the actuating shaft 130 by a series of adjusting bolts 166.

As indicated above, conventional arrangements for securing a valve cover to a valve body and sealing about the periphery of the access opening places tensile stress on the fastener elements. In contrast, the present invention accomplishes these objections by securing the valve cover with fasteners which are placed in compression, and are free of tensile stress. As most clearly seen in FIG. 3, the valve cover 154 is secured within retaining skirt 152 by a retaining wire 170 inserted in a retaining groove formed by opposing slots of generally semi-circular configuration in the outer cylindrical surface of the cover 154 and inner cylindrical surface of the retaining skirt, respectively. The retaining wire 170, which acts as a key member, prevents axial movement of the valve cover 154.

A diaphragm collar 172 is concentrically disposed about the thrust collar 164 for applying sealing pressure between the metal diaphragm 162 and the periphery of the access opening 120. Sealing pressure is applied to the diaphragm collar 172 by a plurality of threaded fastening elements 176 extending through the valve cover in angularly spaced parallel relationship to each other. When advanced toward the diaphragm collar 172 beyond initial contact, the fastening elements 176 cooperate with the retaining ring 170 to secure the valve cover 154 within the retaining skirt 152 and to apply an adjustable sealing force against the valve body.

Significantly, in accordance with the broad aspects of the invention, the fastening members 176, as well as the retaining wire 170 are placed in compression, and are free of tensile stress. As suggested above, placing these fastening elements in compression and eliminating tensile stress reduces the risk that the fasteners will fail during operation and reduces the susceptibility of the fasteners to stress corrosion cracking.

Figure 4:
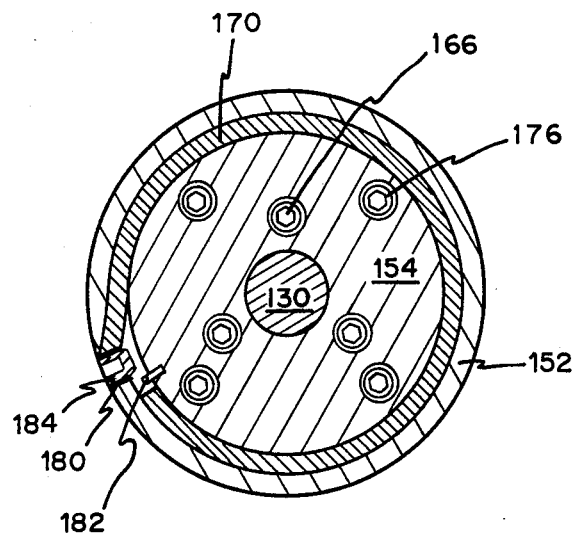
FIG. 4 is a sectional view, taken along line 4—4 in FIG. 3, showing the valve cover and mounting assembly for securing the valve cover against movement along the axial direction of the actuating shaft.

The valve cover 154 is preferably removable to permit servicing and repair to valve 100. With reference to FIG. 4, one manner of inserting the retaining wire 170 into the groove between the valve cover 154 and retaining skirt 152 is illustrated. An opening 180 is provided through the retaining skirt 152 and the retaining wire is longitudinally advanced through this opening 180. As the retaining wire 170 is so advanced, it follows the circumferential path formed by the retaining groove. This advancement is limited by a stop pin 182 fixed into the outer periphery of the valve cover and extending into the groove. Once the retaining wire is inserted, the opening 180 is closed by a plug 184. Preferably, the opening 180 and plug 184 are matchingly threaded and the plug 184 may be readily inserted and removed. It should be apparent from the above, the plug 184 is removed and the retaining wire 170 withdrawn to remove the valve cover 154 from the body 112.

In summary, numerous benefits have been described which result from employing the concepts of the invention. The assembly removably secures a valve cover to a valve body with fasteners which are free of tensile stress. Eliminating the application of tensile stress to the fasteners renders the valve less susceptible to operational failure. Eliminating the application of tensile stresses in the fasteners reduces failures from improper design and material faults. Moreover, the elimination of tensile stress in the fasteners significantly reduces the chances of failure due to stress corrosion cracking. Securing a valve cover with fasteners which are free of tensile stress eliminates the concern of many design engineers who have in the past been relegated to selecting a material for valve fasteners which was not susceptible to stress corrosion cracking from the elements exposed to the fasteners.

The foregoing description of a preferred embodiment of the invention has been presented for purposes of illustration and description. It is not intended to be exhaustive or to limit the inention to the precise form disclosed. Obvious modifications or variations are possible in light of the above teachings. For example, the principles of the invention are not limited to plug valves. Also, other types of fasteners and methods of securing the valve cover to the valve body may be used. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A valve assembly for securing a valve cover to a valve body with fastening means which are free of tensile stress, comprising:
    (a) a valve body, said valve body having an inlet and an outlet and a fluid flow passage extending therebetween;
    (b) a valve member movably disposed within the flow passage of said valve body, said valve member being operative to control fluid flow through said flow passage in accordance with the position of said valve member relative to said valve body, said valve body having an access opening for assembling and accessing said valve member;
    (c) an actuating shaft affixed to said valve member, said actuating shaft being adapted to mechanically interface with an actuating element positioned external to said valve body for effectuating movement of said valve member within said valve body;
    (d) cover means secured to said valve body for covering and sealing said access opening, said cover means including an opening for said actuating shaft;
    (e) fastening means for securing said cover means with respect to said valve body, said fastening means including at least one element partially surrounding the cover means; and
    (f) means for adjustably and sealingly closing said access opening with said cover means without the application of tensile stress to the fastening means, said closing means being operative to apply a varying compressive force to said cover means for compressing the fastening means.

2. A valve asembly as recited in claim 1 wherein said cover means is removably secured to said valve body.

3. A valve assembly as recited in claim 1 wherein said fastening means includes at least one axially adjustable threaded fastening element.

4. A valve assembly as recited in claim 3 wherein said cover means includes a cover member fixed to said valve body against axial movement along said actuating shaft, said threaded fastening element being threadably received in said cover plate and axially adjustably therein.

5. A valve assembly as recited in claim 4 wherein said cover means includes a first collar, at least one of said threaded fastening element being compressingly and adjustably engagable with the first collar.

6. A valve assembly as recited in claim 5 further including a second collar concentrically arranged to said first collar and wherein said cover means further includes a diaphragm, said diaphragm having a centrally disposed aperature for receiving said actuating shaft, said second collar being operative to apply a compressive sealing force between the diaphragm and the actuating shaft.

7. A valve assembly as recited in claim 6 wherein said valve body includes an outwardly extending retaining skirt circumferentially disposed about the access opening, said cover member being secured to said retaining skirt.

8. A valve assembly as recited in claim 7 wherein said valve member is a rotatable plug.

9. A valve assembly as recited in claim 7 wherein said at least one fastening element is a key member extending between the cover member and the retaining skirt.

10. A valve assembly as recited in claim 9 wherein said key member includes a flexible retaining wire.

* * * * *